(12) United States Patent
Hery (10) Patent No.: US 8,237,729 B1
(45) Date of Patent: *Aug. 7, 2012

(54) TEXTURING A TRANSLUCENT SURFACE

(75) Inventor: Christophe Hery, San Rafael, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,975

(22) Filed: Apr. 20, 2011

Related U.S. Application Data (63) Continuation of application No. 11/735,337, filed on Apr. 13, 2007, now Pat. No. 7,952,590.

(51) Int. Cl.
*G09G 5/00* (2006.01)
(52) U.S. Cl. ........................ 345/582; 345/581
(58) Field of Classification Search .................. 345/426, 345/582
See application file for complete search history.

(56) References Cited

U.S. PATENT DOCUMENTS

2006/0227137 A1* 10/2006 Weyrich et al. ............... 345/426

OTHER PUBLICATIONS

Donner, Craig, and Jensen, Henrik Wann, "Light Diffusion in Multi-Layered Translucent Materials" *University of California*, San Diego, 2005.

Hery, Christophe, "Implementing a skin BSSRDF (or several . . . )" 2003.

Heniser, Ryan, "Subsurface Scattering Using Depth Maps" http://www.rendermanacademy.com/docs/SSS_depthmaps.htm pp. 1-17, dated Jan. 12, 2007.

Jensen, Henrik W., Marschner, Stephen R., Levoy, Marc, and Hanrahan, Pat, "A Practical Model for Subsurface Light Transport" *ACM SIGGRAPH Conference*, pp. 1-8, 2001.

Jensen, Henrik W., and Buhler, Juan, "A Rapid Hierarchical Rendering Technique for Translucent Materials" *ACM SIGGRAPH Conference*, 2002.

Robertson, Barbara, "A baby performs impossible acts in extremely close-up scenes thanks to a digital double created at ILM for Lemony Snickey" *Computer Graphics World*, http://www.panoscan.com/PanoPress/2005Press/Lemony/LemonySnicket.html pp. 1-6, dated Jan. 12, 2007.

Weyrich, Tim; Matusik, Wojciech; Pfister, Hanspeter; Bickel, Bernd; Donner, Craig; Tu, Chien; McAndless Janet; Lee, Jinho; Nygan, Addy; Jensen, Henrik Wann; and Gross, Markus, "Analysis of Human Faces using a Measurement-Based Skin Reflectance Model" *Association for Computing Machinery, Inc.*, pp. 1013-1024, dated 2006.

* cited by examiner

*Primary Examiner* — Xiao M. Wu
*Assistant Examiner* — Scott E Sonners
(74) *Attorney, Agent, or Firm* — Fish & Richardson P.C.

(57) ABSTRACT

A computer-implemented method for texturing a modeled surface includes receiving an albedo map corresponding to light scattering under uniform incident diffuse light. The method includes determining, using the albedo map, a local scattering parameter for a multipole bidirectional scattering surface reflectance distribution function (BSSRDF). The method includes texturing a modeled surface using the BSSRDF and the local scattering parameter.

16 Claims, 4 Drawing Sheets

TEXTURING A TRANSLUCENT SURFACE

CLAIM OF PRIORITY

This application is a continuation application of U.S. patent application Ser. No. 11/735,337, filed on Apr. 13, 2007, the entire contents of which are hereby incorporated herein by reference.

TECHNICAL FIELD

This document relates to texturing a modeled surface.

BACKGROUND

When performing computer-based modeling or generation of surfaces, it is important that light scattering be done in a way that resembles the natural reflection. The more realistic the light scattering, the more natural-looking and believable the image will be. One category of surfaces that have specific scattering properties are so-called translucent or transparent materials. These occur frequently in nature in a variety of contexts. Organic materials such as skin, liquids, and food items can have translucent properties, as can inorganic materials such as marble and other minerals, to name a few examples.

In some examples, translucency can occur in nature because the material at issue is multilayered. For example, skin is such a material, and photons that enter the outer surface of the skin can be subject to several scatterings therein. Sometimes the scattered photon is eventually absorbed inside the material or continues further into the underlying tissue, but there is a likelihood that at least some of the scattered photons will exit the multilayered skin structure through the outer surface where they entered. In so doing, some of the photons can emerge from the skin at locations other than their point of entry.

SUMMARY

In a first aspect, a computer-implemented method for texturing a modeled surface includes receiving an albedo map corresponding to light scattering under uniform incident diffuse light. The method includes determining, using the albedo map, a local scattering parameter for a multipole bidirectional scattering surface reflectance distribution function (BSSRDF). The method includes texturing a modeled surface using the BSSRDF and the local scattering parameter.

Implementations can include any, all or none of the following features. The method can further include performing the scattering to obtain the albedo map. Determining the local scattering parameter can include an iterative process. Determining the local scattering parameter can include inverting a first formula that relates diffuse reflectance to at least the local scattering parameter. The first formula can be:

$$R_d = R_{d0} + \frac{\alpha'}{2}\left(e^{-B} - e^B - e^{(1+\frac{2}{3}A)B} + e^{-(1+\frac{2}{3}A)B}\right) \square \frac{e^{-\frac{8}{3}A(n+1)B} - e^{-\frac{8}{3}AB}}{e^{-\frac{8}{3}AB} - 1},$$

wherein $R_d$ is a determined reflectance, $R_{d0}$ is a dipole approximation of a reflectance, and wherein $$A = \frac{1 + F_{dr}}{1 - F_{dr}} = \text{function}(\eta)$$

and $B = \sqrt{3(1-\alpha')} = \sigma_{tr} l$.

The method can further include obtaining the first formula by performing an approximation on a second formula. The second formula can be an infinite summation for the BSSRDF, and the approximation can include identifying a contribution of a dipole to the BSSRDF. The method can further include using also a mean free path parameter in texturing the modeled surface. The local scattering parameter can be a reduced transport albedo.

In a second aspect, a computer program product is tangibly embodied in an information carrier and includes instructions that when executed by a processor perform a method for texturing a modeled surface. The method includes receiving an albedo map that corresponds to light scattering under uniform incident diffuse light. The method includes determining, using the albedo map, a local scattering parameter for a multipole bidirectional scattering surface reflectance distribution function (BSSRDF). The method includes texturing a modeled surface using the BSSRDF and the local scattering parameter.

Implementations can include any, all or none of the following features. The method can further include performing the scattering to obtain the albedo map. Determining the local scattering parameter can include an iterative process. Determining the local scattering parameter can include inverting a first formula that relates diffuse reflectance to at least the local scattering parameter. The method can further include obtaining the first formula by performing an approximation on a second formula. The second formula can be an infinite summation for the BSSRDF, and the approximation can include identifying a contribution of a dipole to the BSSRDF. The method can further include using also a mean free path parameter in texturing the modeled surface. The local scattering parameter can be a reduced transport albedo.

Implementations can provide any, all or none of the following advantages: providing an improved computer-based representation of a translucent surface; providing an improved texturing of a surface; providing an improved texturing of a thin translucent surface; providing an inversion technique for determining a parameter to be used in surface texturing; and/or providing a technique for determining a local scattering parameter to be used in generating a computer-based surface.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
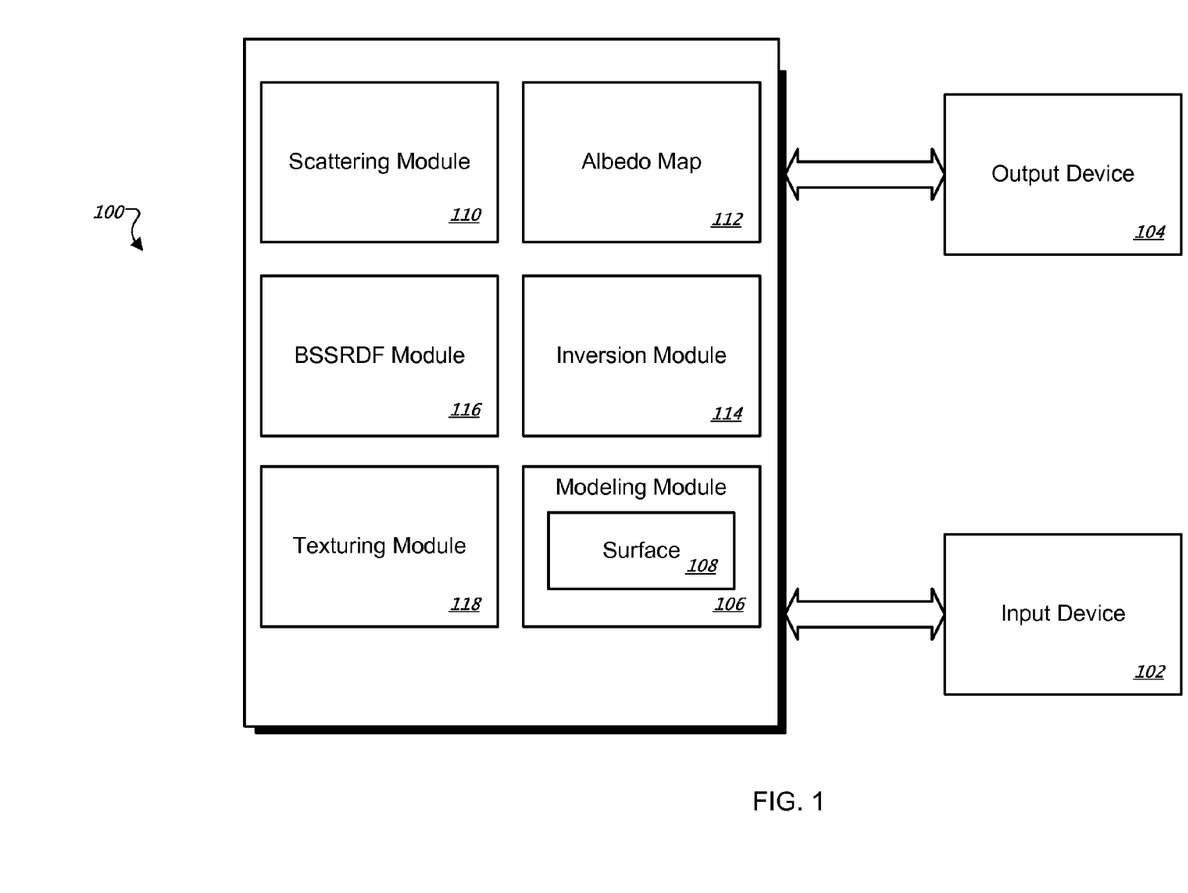
FIG. 1 is a block diagram showing an example system that can be used for texturing surfaces.

FIG. 1 is a block diagram showing an example system 100 that can be used for texturing surfaces. The system includes one or more input devices 102 and one or more output devices 104. The one or more input devices 102 can be used to allow a user of the system 100 to input commands. The input devices 102 can generate commands to open a file, launch an application (e.g., a modeling application), edit information (e.g., geometric information corresponding to a surface), or invoke a texturing procedure, to name a few examples. Input devices 102 include, but are not limited to, a keyboard, a mouse, a stylus, or other pointing devices. The one or more input devices 102 can be connected to the system 100 using a traditional communications bus. For example, a keyboard can be connected using a PS/2 connection or a Universal Serial Bus (USB) connection. Moreover, in certain implementations, the one or more input devices 102 can be connected to the system 100 through a wireless connection.

Output devices 104 can be used to display a textured surface, or user interface involved in the creation of the textured surface, to name two examples. For example, a user can input a texturing request into the system 100 using input devices 102 and the system 100 can display the results of the texturing request on output devices 104. Output devices include various types of monitors and display devices including an LCD display or a CRT display, to name two examples.

Users of the system 100 can use the input devices 102 and the output devices 104 to aid in the execution and visualization of texturing surfaces, respectively. Texturing (e.g., texture mapping) is a process that can add detail to a surface of an object. When texturing, textures can be applied to the surface to change an object's appearance. In certain implementations, textures are two-dimensional image objects that contain the colors that are textured. Textures can be applied to a surface object by mapping the information from the texture object to the surface object. For example, the surface object representing a sphere can be textured using an image object representing the surface of a baseball (e.g., a generally white surface with red stitches). By mapping values from the image object to the surface object, the texturing process can generate a spherical baseball object with an appropriate visual representation. Because the exterior of a baseball is generally opaque, the light reflecting off of the surface of the baseball object can contribute uniformly to the properties of the texture; there is little or no subsurface scattering, for example.

Subsurface scattering can occur more prominently in a translucent, transparent, or partially transparent surface. Light can penetrate or partially penetrate translucent surfaces. Light that penetrates the exterior of the surface can scatter in the interior of the surface. Scattered light can also exit the surface at the point of entry or elsewhere on the surface. Moreover, different wavelengths of light are typically attenuated differently. Because the component wavelengths of light can scatter in the interior of the surface at different rates and exit the surface, information (e.g., color) of the interior of the surface can become visible. Consider, for example, a raw egg containing a first translucent surface (e.g., the egg white) and a second translucent surface (e.g., the egg yolk). Light that penetrates and scatters in the egg white surface can provide color information regarding the egg yolk contained within.

Textures of translucent materials can be applied to surfaces by system 100. Such a surface can be modeled in the system 100, in some implementations. For this and other purposes, the system 100 also includes a modeling module 106. The modeling module can be used to generate and animate objects. Modeling modules include, but are not limit to, modules included in RenderMan™ from Pixar (Emeryville, Calif.), Zeno™ from Industrial Light and Magic (San Francisco, Calif.), and Maya™ from Autodesk (Mill Valley, Calif.). The modeling module 106 can be used to generate one or more surfaces. For example, the modeling module 106 here includes surface 108. In certain implementations, the surface 108 is represented geometrically in a three-dimensional space. The surface 108 can provide a structure that can be textured. For example, the surface 108 can represent a sphere that can be textured with an opaque baseball texture or it can represent the façade of a building that can be textured with a translucent marble texture.

The system 100 also includes a scattering module 110. The scattering module 110 can be used to project light on a surface and measure the light scattered by the surface. For example, the scattering module 110 can use a virtual light source to project the light and then measure the diffuse reflectance of the light. In certain implementations, the scattering module 110 can use a uniform incident diffuse light source. For example, the scattering module 110 can use a point light source. The observed diffuse reflectance light can be stored in a map that records one or more parameters or aspects of the scattered light, including a local coefficient of the scattering.

The system 100 also includes an albedo map 112. The albedo map 112 here represents the incident light reflected from a surface. For example, the albedo map 112 can be determined from the results measured by the scattering module 110. In certain implementations, the albedo map 112 is a two-dimensional structure that represents the incident reflections in an image scene. The albedo map 112 can be a two-dimensional array that reflects the dimensions (e.g., width and height) of the image scene. For example, the two-dimensional array can be indexed using a pair of index values in the range of [0, width-1] and [0, height-1] where width and height are the width and height of the image scene, respectively.

The system 100 also includes an inversion module 114. The inversion module 114 can be used to compute a local scattering parameter (e.g., a reduced transport albedo). For example, the inversion module 114 can invert a reflectance formula to determine the local scattering parameter. In certain implementations, the local scattering parameter can be generated iteratively using a root-finding algorithm or interpolation. Moreover, in certain implementations, once the local scattering parameter is deduced, the albedo map 112 can be used for other purposes or discarded. In an example below it will be described a formula that can be used in the inversion.

The system 100 also includes a bidirectional scattering surface reflectance distribution function (BSSRDF) module 116. The BSSRDF module 116 can be used to determine the reflectance of light in a translucent surface. For example, the BSSRDF module 116 can be used by the scattering module 110 to approximate the light reflected from the surface 108. In certain implementations, the BSSRDF module 116 can be used to approximate a dipole configuration or a multipole configuration to account for the scattering of light inside a surface. An example multipole configuration is described in more detail in reference to FIG. 2.

The system 100 also includes a texturing module 118. The texturing module 118 can be used to texture a surface with an opaque or translucent texture. If the texturing module 118 is texturing a translucent texture, the texturing module 118 can texture the surface 108 using reflectance information determined by the BSSRDF module 116 using the local scattering parameter. For example, the BSSRDF module can use the local scattering parameter to obtain the modulated translucent layer for surface 118. The texturing module 118 can then texture the modulated translucent layer using a traditional texturing approach (e.g., texture mapping). In certain implementations, the texturing module 118 can use a mean free path parameter to texture the surface 108.

In certain implementations, the system 100 can have more than one module operating in parallel to improve performance. For example, the system 100 can include more than one inversion module 114 which can operate in parallel to increase the speed of the inversion method. Moreover, in certain implementations, some or all modules can be combined with each other or distributed over several systems. For example, the scattering module 110 can be combined with the BSSRDF module 116 to form a combined module or the inversion module 114 can be located on a distributed system and accessed by system 100 during an inversion task.

Figure 2:
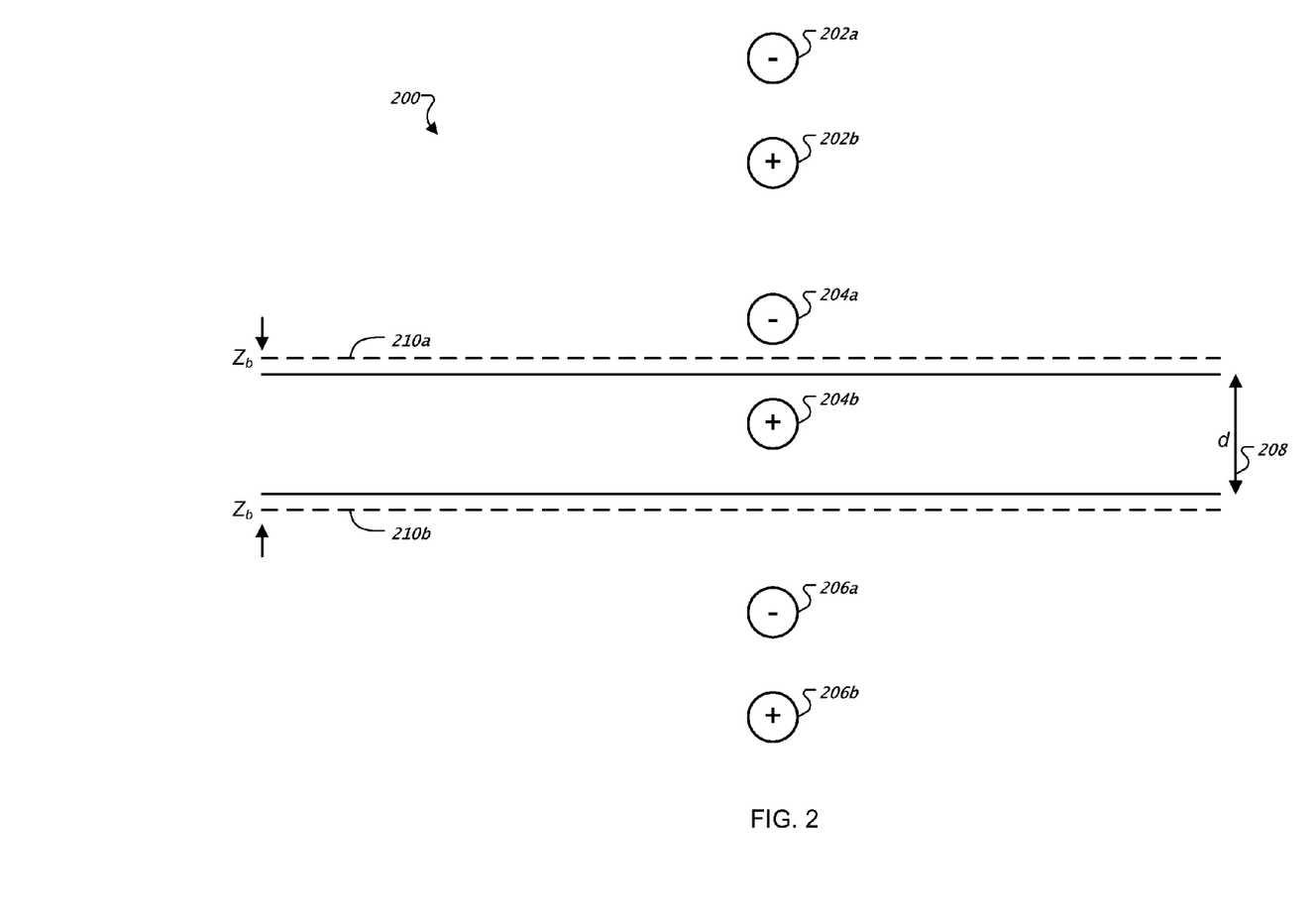
FIG. 2 schematically shows an example multipole configuration.

FIG. 2 shows an example multipole configuration 200. A multipole configuration is an accumulation of poles, such as a number of dipoles. Each dipole includes a positive pole and a negative pole which can represent a positive light source and a negative light source, respectively. The multipole configuration 200 here can be used by the system 100 to approximate reflectance of thin translucent materials (e.g., textures). For example, the BSSRDF module 116 can use a multipole configuration and a local scattering parameter generated from the inversion module 114 to approximate the reflectance of a texture by measuring the interactions of the positive and negative light sources with the thin translucent material. The texturing module 118 can use the information determined from the BSSRDF module 116 to texture the thin translucent material on a surface 108 in the modeling module 106.

In the example multipole configuration 200, negative poles 202a, 204a, 206a and positive poles 202b, 204b, and 206b are shown such that poles 202a and 202b form a dipole, for example. In certain implementations, there can be an infinite series of dipoles in a multipole configuration. The poles (e.g., poles 202a-206b) can be used to specify locations of point light sources. For example, the negative poles (i.e., poles 202a, 204a, and 206a) are negative light sources and positive poles (i.e., poles 202b, 204b, and 206b) are positive light sources. The sign of the pole can indicate the light contribution of the pole. For example, the positive light sources can add light and the negative light sources can subtract light.

As illustrated by arrow 208, d is the thickness of the translucent material. The thickness of the material can determine the number of dipole pairs to be used. For example, if the material has a semi-infinite thickness d, a single dipole pair (e.g., dipole pair 204a and 204b) can be used to approximate reflectance. Conversely, for example, if d is not semi-infinite, more than one pair of dipoles (e.g., multipole configuration 200) can be used to approximate reflectance.

As illustrated by lines 210a and 210b, $Z_b$ is an extrapolation distance. The extrapolation distance typically defines where the fluence (i.e., light energy per unit area) measured from the surface of the translucent material is reduced, or nearly reduced, to zero. In certain implementations, the extrapolation distance is determined using linear extrapolation of the light values. For example, the negative light source 204a interacting with the positive light source 204b can result in zero fluence at $Z_b$, represented by lines 210a. In addition, line 210b can represent a fluence value of or near zero for the interaction of the negative light source 206a and the positive light source 206b, for example.

The BSSRDF module 116 can use the interaction of positive and negative light sources to determine reflectance and transmittance values for the light at the surface of the thin material. For example, the reflectance and transmittance values generated by the multipole configuration 200 can be measured by the scattering module 110 to generate an albedo map 112. As described previously, the texturing module 118 can then use the BSSRDF module 116 and the albedo map 112 to texture the surface 108 with the translucent texture.

Figure 3:
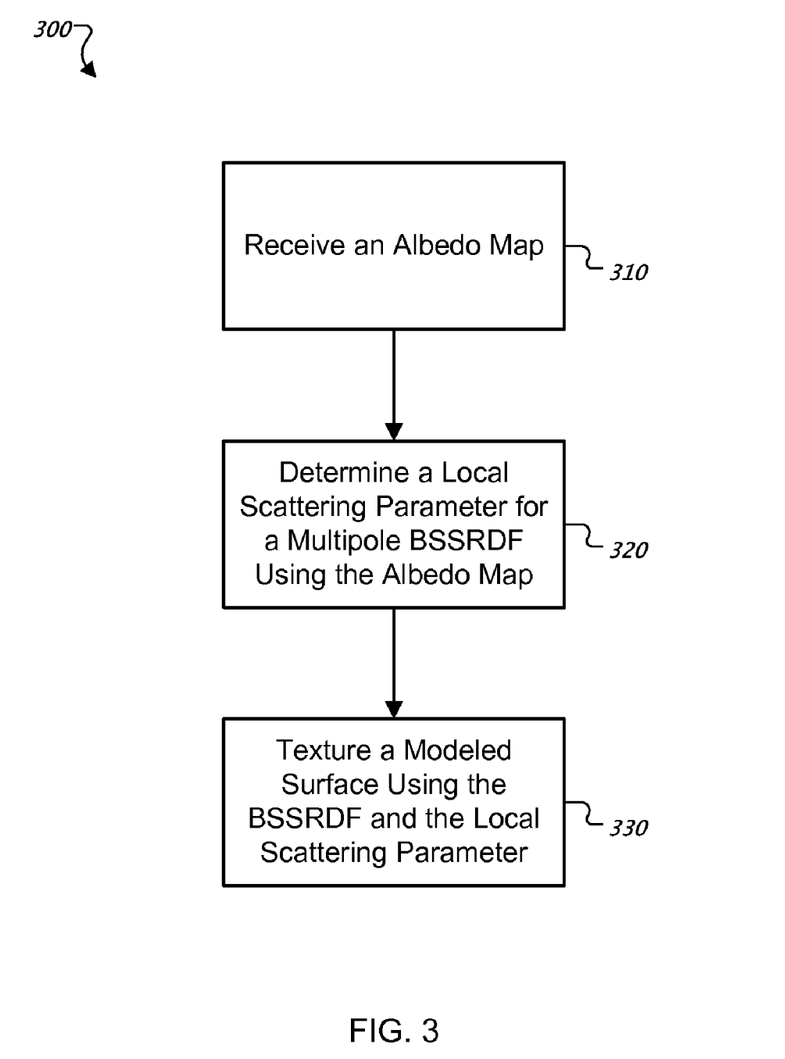
FIG. 3 is a flow chart showing an example method used for texturing surfaces.

FIG. 3 shows an example method 300 used for texturing surfaces. In step 310, an albedo map is received by the system 100. For example, scattering module 110 can generate an albedo map using the BSSRDF module 116 and measuring light reflected from surface 108. The scattering module 110 can send the generated albedo map 112 to the system 100 for further processing. Moreover, the system 100 can store the received albedo map 112 for use in subsequent steps or subsequent texturing procedures (e.g., subsequent executions of method 300). In certain implementations, the albedo map 112 can be received from a distributed system or module. For example, a previously determined albedo map can be accessed from a storage medium by system 100 for use in subsequent steps.

In step 320, a local scattering parameter is determined for a multipole BSSRDF configuration using the albedo map received in step 310. For example, the inversion module 114 can invert a BSSRDF approximation. The inversion module 114 can receive a multipole configuration and albedo map values as inputs. The inversion module 114 can use the inputs to determine the local scattering parameter. For example, in certain implementations, the inversion module 114 can use a root-solver or another iterative process to determine the local scattering parameter.

In step 330, a translucent surface is textured using a BSSRDF configuration and the local scattering parameter determined in step 320. For example, the texturing module 118 can use the local scattering parameter and the BSSRDF module 116 (e.g., using a multipole configuration) to generate a translucent layer (e.g., a texture). The texturing module 118 can then apply the texture to the surface 108 generated by the modeling module 106. The texturing module 118 can map the values of the translucent texture to the surface 108 using traditional texture mapping techniques, for example.

The following algorithms can be used to determine, for example, the reflectance as a function of a local scattering parameter and one or more other variables. Such a reflectance function can then be inverted, for example when the reflectance is known, to obtain an indication of the value of the local scattering parameter depending on the reflectance and the other parameter(s). First, placeholder values A and D can be defined as $$A = \frac{1 + F_{dr}}{1 - F_{dr}} = \text{function}(\eta) \text{ and } D = \frac{1}{3\sigma'_t} = \frac{l}{3},$$

respectively. Here $F_{dr}$ is the Fresnel diffuse reflectance of the translucent surface and D is the diffusion constant. In addition, $\sigma'_t$ is the reduced extinction coefficient. Moreover, the extrapolation distances (e.g., extrapolation distances 210a and 210b) can be defined as $$Z_b(0) = 2A(0)D = \frac{2}{3}lA(0) \text{ and } Z_b(d) = 2A(d)D = \frac{2}{3}lA(d),$$

where d is the thickness (e.g., thickness 208) of the translucent material. Particularly, the value "0" for A corresponds to the value of η in the position at the top of the stack of multipoles and "d" corresponds to the value of η in the position at the bottom. In addition, the distances to point light sources (e.g., point light sources 202a-206b) can be defined as $$(dr) = x = \sqrt{r^2 + z^2}$$

such that $$\frac{dx}{dr} = \frac{2r}{2\sqrt{r^2 + z^2}} = \frac{r}{x} \rightarrow rdr = xdx.$$

In certain implementations, the light at each of points $z_{r,i}$ and $z_{v,i}$ can be defined as $$z_{r,i} = 2i(d + z_b(0) + z_b(d)) + l \text{ and } z_{v,i} = 2i(d + z_b(0) + z_b(d)) - l - 2z_b(0),$$

respectively. Here, l is the depth value of the light source embedded inside a translucent material. For example, the distance to the positive light sources (e.g., light sources 202b, 204b, and 206b) can be defined as $$d_{r,i} = \sqrt{r^2 + z^2_{r,i}},$$

where i can range from $[-n \ldots n]$. As illustrated by FIG. 2, in example multipole configuration 200, i=−1, 0 and 1 are shown. Because, in certain implementations, a multipole configuration can have an infinite series of dipoles, n can be any number. Furthermore, for example, the distance to the negative light sources (e.g., light sources 202a, 204a, and 206a) can be defined as $$d_{v,i} = \sqrt{r^2 + z^2_{v,i}},$$

again where i can ran range from $[-n \ldots n]$ and n can be any number.

To compute the reflected light, the light reflected by the translucent surface from the point light sources can be summed. For example, the following algorithm can be used $$R_d(r) = \frac{\alpha'}{4\pi} \left[ \sum_{i=-n}^{n} z_{r,i} \left(\sigma_{tr} + \frac{1}{d_{r,i}}\right) \frac{e^{-\sigma_{tr} d_{r,i}}}{d^2_{r,i}} - z_{v,i} \left(\sigma_{tr} + \frac{1}{d_{v,i}}\right) \frac{e^{-\sigma_{tr} d_{v,i}}}{d^2_{v,i}} \right]$$

to determine the reflected light $R_d$. In certain implementations, for example, the value $R_d$ can be determined using the scattering module 110. Because, in certain implementations, $R_d$ is known, the algorithm can be inverted using inversion module 114 to solve for the local scattering parameter $\alpha'$ (i.e., a reduced transport albedo). Here, $\sigma_{tr}$ is the diffuse mean path. The determination of $R_d$ over all values of r then becomes $$R_d = 2\pi \int_{r=0}^{\infty} R_d(r) r \, dr = \frac{\alpha'}{2} \left[ \sum_{i=-n}^{n} \int_{r=0}^{\infty} z_{r,i} \left(\sigma_{tr} + \frac{1}{d_{r,i}}\right) \frac{e^{-\sigma_{tr} d_{r,i}}}{d^2_{r,i}} r \, dr - \sum_{i=-n}^{n} \int_{r=0}^{\infty} z_{v,i} \left(\sigma_{tr} + \frac{1}{d_{v,i}}\right) \frac{e^{-\sigma_{tr} d_{v,i}}}{d^2_{v,i}} r \, dr \right]$$

which becomes $$= \frac{\alpha'}{2} \left[ \sum_{i=-n}^{n} \int_{|z_{r,i}|}^{\infty} z_{r,i} \left(\sigma_{tr} + \frac{1}{x}\right) \frac{e^{-\sigma_{tr} x}}{x^2} x \, dx - \sum_{i=-n}^{n} \int_{|z_{v,i}|}^{\infty} z_{v,i} \left(\sigma_{tr} + \frac{1}{x}\right) \frac{e^{-\sigma_{tr} x}}{x^2} x \, dx \right]$$

and $$= \frac{\alpha'}{2} \left[ \sum_{i=-n}^{n} \sigma_{tr} z_{r,i} I(|z_{r,i}|) + z_{r,i} J(|z_{r,i}|) - \sum_{i=-n}^{n} \sigma_{tr} z_{v,i} I(|z_{v,i}|) + z_{v,i} J(|z_{v,i}|) \right],$$

where $I$ is defined as $$I(a) = \int_a^{\infty} \frac{e^{-\sigma_{tr} x}}{x} \, dx$$

and $J$ is defined as $$J(a) = \int_a^{\infty} \frac{e^{-\sigma_{tr} x}}{x^2} \, dx = -\sigma_{tr} x I(a) + \frac{e^{-\sigma_{tr} a}}{a},$$

respectively. Using the definitions of I and J the determination of $R_d$ can be modified to the form $$R_d = \frac{\alpha'}{2} \left[ \sum_{i=-n}^{n} \sigma_{tr} z_{r,i} I(|z_{r,i}|) - z_{r,i} \sigma_{tr} I(|z_{r,i}|) + z_{r,i} \frac{e^{-\sigma_{tr} |z_{r,i}|}}{|z_{r,i}|} - \sum_{i=-n}^{n} \sigma_{tr} z_{v,i} I(|z_{v,i}|) - z_{v,i} \sigma_{tr} I(|z_{v,i}|) + z_{v,i} \frac{e^{-\sigma_{tr} |z_{v,i}|}}{|z_{v,i}|} \right]$$

and further simplified to $$= \frac{\alpha'}{2} \sum_{i=-n}^{n} \text{Sign}(z_{r,i}) e^{-\sigma_{tr} |z_{r,i}|} - \text{Sign}(z_{v,i}) e^{-\sigma_{tr} |z_{v,i}|}.$$

In the example where n is zero, and where $$z_{r,0} = l > 0 \text{ and } z_{v,0} = -l - 2z_b(0) < 0,$$

then $R_d$ can be represented as $$R_d = \frac{\alpha'}{2} \left[ e^{-\sigma_{tr} l} + e^{-\sigma_{tr}(l + 2z_b)} \right].$$

Given that $$\sigma_{tr} = \frac{\sqrt{3(1-\alpha')}}{l}, \text{ and } z_b(0) = z_b = \frac{2}{3} Al,$$

$R_d$ can be expressed as $$R_d = \frac{\alpha'}{2} \left[ e^{-\sqrt{3(1-\alpha')}} + e^{-\sqrt{3(1-\alpha')}\left(1 + \frac{4}{3} A\right)} \right]$$

and finally to $$= \frac{\alpha'}{2} e^{-\sqrt{3(1-\alpha')}} \left(1 + e^{-\sqrt{3(1-\alpha')}\frac{4}{3} A}\right) = R_{d0},$$

which coincides with how $R_{d0}$ can be approximated in a dipole representation of a Bidirectional Reflectance Distribution Function (BRDF). For example, this approximation can be inverted and used in determining one or more parameters for a reflection distribution.

Instead of this approximation, there will here be used the expression for $R_d$ obtained above, namely $$R_d = \frac{\alpha'}{2} \sum_{i=-n}^{n} \text{Sign}(z_{r,i}) e^{-\sigma_{tr} |z_{r,i}|} - \text{Sign}(z_{v,i}) e^{-\sigma_{tr} |z_{v,i}|}$$

together with the relationship $$\sigma_{tr} = \frac{\sqrt{3(1-\alpha')}}{l} \geq 0.$$

It is obtained that $$z_{r,i} = 2i\left(d + \frac{2}{3}l(A(0) + A(d))\right) + l$$

wherein for $i \geq 0 \Rightarrow z_{r,i} \geq l \geq 0,$ and for $i \leq -1 \Rightarrow z_{r,i} =$ $$\left(1 + \frac{4i}{3}(\underbrace{A(0)}_{\geq 1} + \underbrace{A(d)}_{\geq 1})\right)l + \underbrace{2id}_{\leq 0} \leq \left(1 + \frac{4i}{3}\Box 2\right)l \leq \left(1 - \frac{8}{3}\right)l \leq 0.$$

It is also obtained that $$z_{v,i} = 2i\left(d + \frac{2}{3}l(A(0) + A(d))\right) - l - \frac{2}{3}A(0)l$$

wherein for $i \leq 0 \Rightarrow z_{v,i} \leq 0,$ and for $i \geq 1 \Rightarrow z_{v,i} =$ $$\left(\frac{2}{3}\left(\underbrace{\frac{A(0)(2i-1)}{\geq 1}}_{\geq 1} + \underbrace{\frac{2iA(d)}{\geq 2}}_{\geq 1}\right) - 1\right)l + 2id \geq \left(\frac{2}{3}(1+2) - 1\right)l = l \geq 0.$$

It then follows that $$R_d = R_{d0} + \frac{\alpha'}{2}\left[\sum_{i=1}^{n} e^{-\sigma_{tr}z_{r,i}} - \sum_{i=-n}^{-1} e^{+\sigma_{tr}(2l-z_{r,i})} - \sum_{i=1}^{n} e^{-\sigma_{tr}z_{v,i}} + \sum_{i=-n}^{-1} e^{+\sigma_{tr}z_{v,i}}\right].$$

In addition, because $z_{r,-i} = 2l - z_{r,i},\ z_{v,-i} = -\frac{2}{3}A(0)l - z_{r,i},$ and $z_{v,i} = z_{r,i} - 2l - \frac{2}{3}A(0)l,$ it follows that $$R_d = R_{d0} + \frac{\alpha'}{2}\left[\begin{array}{l}\sum_{i=1}^{n} e^{-\sigma_{tr}z_{r,i}} - \sum_{i=1}^{n} e^{+\sigma_{tr}(2l-z_{r,i})} - \\ \sum_{i=1}^{n} e^{-\sigma_{tr}(z_{r,i}-2l-\frac{2}{3}A(0)l)} + \sum_{i=1}^{n} e^{+\sigma_{tr}(-\frac{2}{3}A(0)l-z_{r,i})}\end{array}\right].$$

From this it follows that $$R_d = R_{d0} + \frac{\alpha'}{2}\sum_{i=1}^{n} e^{-\sigma_{tr}z_{r,i}}(1 - e^{2\sigma_{tr}l} - e^{2\sigma_{tr}(1+\frac{1}{3}A(0))l} + e^{-\frac{2}{3}A(0)\sigma_{tr}l})$$

and that $$R_d = R_{d0} + \frac{\alpha'}{2}(1 - e^{2\sigma_{tr}l} - e^{2\sigma_{tr}(1+\frac{1}{3}A(0))l} + e^{-\frac{2}{3}A(0)\sigma_{tr}l})\sum_{i=1}^{n} e^{-\sigma_{tr}z_{r,i}}.$$

Moreover, a simplification parameter $B = \sqrt{3(1-\alpha')} = \sigma_{tr}l$ can be introduced and because $$z_{r,i} = 2i\left(d + \frac{2}{3}l(A(0) + A(d))\right) + l$$

and $\sigma_{tr} = \frac{\sqrt{3(1-\alpha')}}{l},$ determining $R_d$ can be further simplified. For example, assuming the simplification that the index of refraction is the same at 0 and d, which means that $A(0) = A(d) = A,$ and that the value of d is small enough that it can be omitted, the formula for determining $R_d$ can be written as $$R_d = R_{d0} + \frac{\alpha'}{2}(1 - e^{2B} - e^{2B(1+\frac{1}{3}A)} + e^{-\frac{2}{3}AB})\sum_{i=1}^{n} e^{-(1+\frac{8Ai}{3})B}, =$$

$$R_{d0} + \frac{\alpha'}{2}(1 - e^{2B} - e^{2B(1+\frac{1}{3}A)} + e^{-\frac{2}{3}AB})\Box e^{-B}\Box\frac{(e^{-\frac{8}{3}A(n+1)\Box B} - e^{-\frac{8}{3}AB})}{e^{-\frac{8}{3}AB} - 1}, =$$

$$R_{d0} + \frac{\alpha'}{2}(e^{-B} - e^{B} - e^{(1+\frac{2}{3}A)B} + e^{-(1+\frac{2}{3}A)B})\Box\frac{e^{-\frac{8}{3}A(n+1)B} - e^{-\frac{8}{3}AB}}{e^{-\frac{8}{3}AB} - 1}.$$

Assuming now that $n \to \infty$ it follows that $$R_d \to R_{d0} + \frac{\alpha'}{2}(e^{-B} - e^{B} - e^{(1+\frac{2}{3}A)B} + e^{-(1+\frac{2}{3}A)B})\frac{e^{-\frac{8}{3}AB}}{1 - e^{-\frac{8}{3}AB}},$$

such that $$R_d \to R_{d0} + \frac{\alpha'}{2}\left(\frac{e^{-(1+\frac{8}{3}A)B} - e^{(1+\frac{8}{3}A)B} - e^{(1-2A)B} + e^{-(1+\frac{10}{3}A)B}}{1 - e^{-\frac{8}{3}AB}}\right).$$

where $R_{d0}$ can be the value of $R_d$ in a dipole configuration, and $R_d$ is the value of a multiple configuration using a BSS-RDF. Because, in certain implementations, the values of $R_d$ and $R_{d0}$ can be determined, e.g. by scattering, using the above algorithms can determine a local scattering parameter $\alpha'$. For example, the last formula can be inverted, for a particular value of $R_d$, with a Newton solver to obtain the value of the local scattering parameter $\alpha'$.

Figure 4:
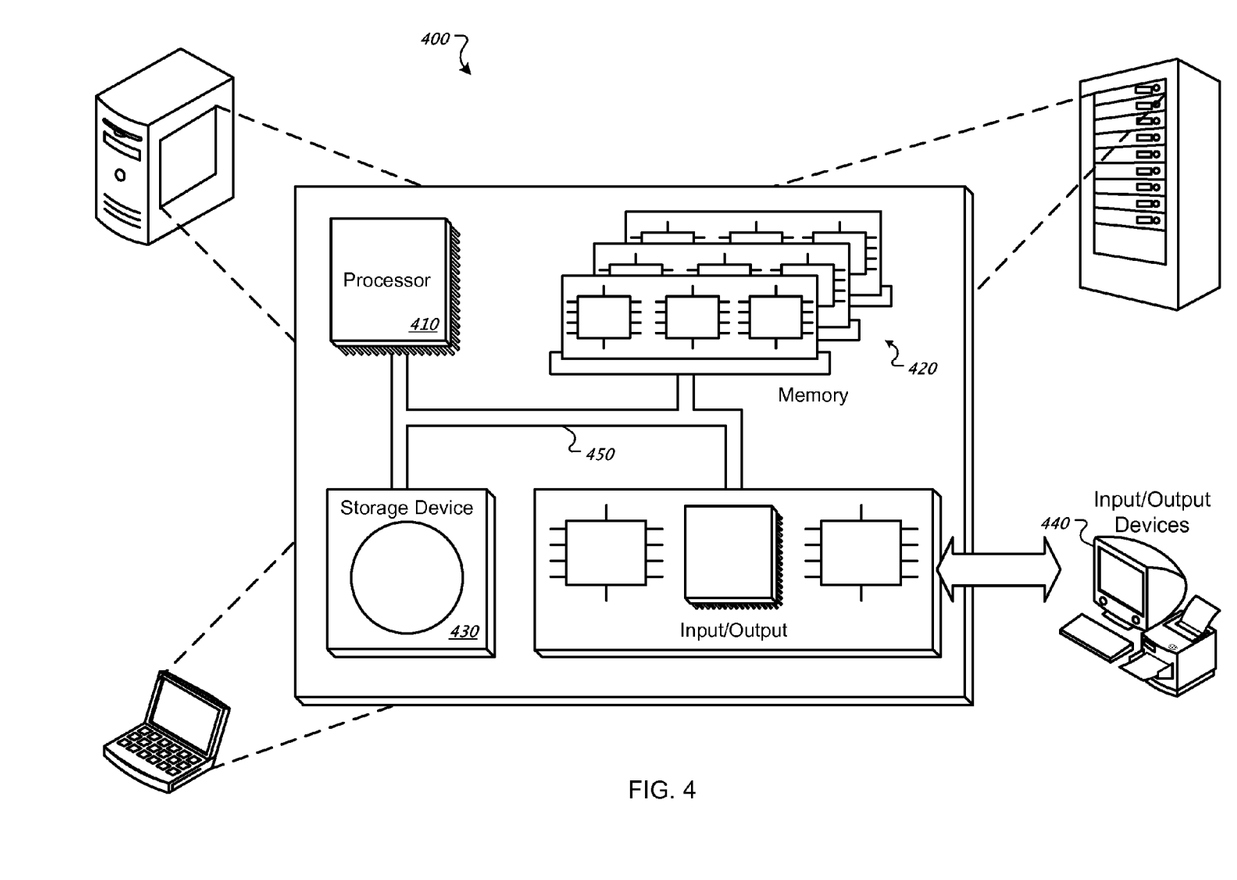
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for texturing a modeled surface, the method comprising:
receiving, in a computer device, an albedo map corresponding to light scattering under uniform incident diffuse light;
determining, using the computer device and the albedo map, a local scattering parameter for a multipole bidirectional scattering surface reflectance distribution function (BSSRDF);
wherein determining the local scattering parameter comprises use of an inversion of a first formula that relates diffuse reflectance to at least the local scattering parameter, the first formula based in part on a first value that approximates diffuse reflectance in a dipole representation of a bidirectional reflectance distribution function (BRDF) and a second value that is combined with the first value to approximate diffuse reflectance in a multipole representation of the BRDF; and
texturing, using the computer device, a modeled surface for display on a display device using the BSSRDF and the local scattering parameter.

2. The computer-implemented method of claim 1, further comprising performing the scattering to obtain the albedo map.

3. The computer-implemented method of claim 1, wherein determining the local scattering parameter comprises an iterative process.

4. The computer-implemented method of claim 1, wherein the first formula is:

$$R_d = R_{d0} + \frac{\alpha'}{2}(e^{-B} - e^B - e^{(1+\frac{2}{3}A)B} + e^{-(1+\frac{2}{3}A)B}) \cdot \frac{e^{-\frac{8}{3}A(n+1)B} - e^{-\frac{8}{3}AB}}{e^{-\frac{8}{3}AB} - 1},$$

wherein $R_d$ is a determined reflectance, $R_{d0}$ is a dipole approximation of a reflectance, and wherein $$A = \frac{1+F_{dr}}{1-F_{dr}} = \text{function}(\eta) \text{ and } B = \sqrt{3(1-\alpha')} = \sigma_{tr}l.$$

5. The computer-implemented method of claim 1, further comprising obtaining the first formula by performing an approximation on a second formula.

6. The computer-implemented method of claim 5, wherein the second formula is an infinite summation for the BSSRDF, and wherein the approximation comprises identifying a contribution of a dipole to the BSSRDF.

7. The computer-implemented method of claim 1, further comprising using also a mean free path parameter in texturing the modeled surface.

8. The computer-implemented method of claim 1, wherein the local scattering parameter is a reduced transport albedo.

9. A computer program product tangibly embodied in a computer-readable storage device and comprising instructions that when executed by a processor perform a method for texturing a modeled surface, the method comprising:
   receiving, in a computer device, an albedo map that corresponds to light scattering under uniform incident diffuse light;
   determining, using the computer device and the albedo map, a local scattering parameter for a multipole bidirectional scattering surface reflectance distribution function (BSSRDF);
   wherein determining the local scattering parameter comprises use of an inversion of a first formula that relates diffuse reflectance to at least the local scattering parameter, the first formula based in part on a first value that approximates diffuse reflectance in a dipole representation of a bidirectional reflectance distribution function (BRDF) and a second value that is combined with the first value to approximate diffuse reflectance in a multipole representation of the BRDF; and
   texturing, using the computer device, a modeled surface for display on a display device using the BSSRDF and the local scattering parameter.

10. The computer program product of claim 9, further comprising performing the scattering to obtain the albedo map.

11. The computer program product of claim 9, wherein determining the local scattering parameter comprises an iterative process.

12. The computer program product of claim 9, further comprising obtaining the first formula by performing an approximation on a second formula.

13. The computer program product of claim 12, wherein the second formula is an infinite summation for the BSSRDF, and wherein the approximation comprises identifying a contribution of a dipole to the BSSRDF.

14. The computer program product of claim 9, further comprising using also a mean free path parameter in texturing the modeled surface.

15. The computer program product of claim 9, wherein the local scattering parameter is a reduced transport albedo.

16. The computer-implemented method of claim 9, wherein the first formula is:

$$R_d = R_{d0} + \frac{\alpha'}{2}(e^{-B} - e^B - e^{(1+\frac{2}{3}A)B} + e^{-(1+\frac{2}{3}A)B}) \cdot \frac{e^{-\frac{8}{3}A(n+1)B} - e^{-\frac{8}{3}AB}}{e^{-\frac{8}{3}AB} - 1},$$

wherein $R_d$ is a determined reflectance, $R_{d0}$ is a dipole approximation of a reflectance, and wherein $$A = \frac{1+F_{dr}}{1-F_{dr}} = \text{function}(\eta) \text{ and } B = \sqrt{3(1-\alpha')} = \sigma_{tr} l.$$

* * * * *